United States Patent [19]

Ohkawa

[11] Patent Number: 4,990,387
[45] Date of Patent: Feb. 5, 1991

[54] OPTICAL MEMORY
[75] Inventor: Hideki Ohkawa, Tokyo, Japan
[73] Assignee: Kabushiki Kaisha Toshiba, Kawasaki, Japan
[21] Appl. No.: 303,612
[22] Filed: Jan. 30, 1989
[30] Foreign Application Priority Data
  Jan. 30, 1988 [JP] Japan .................. 63-20312
[51] Int. Cl.$^5$ ............................ B32B 3/02
[52] U.S. Cl. ........................ 428/64; 428/65; 428/408; 428/913; 369/288; 346/76 L; 346/135.1; 430/945
[58] Field of Search ............ 428/64, 65, 408, 913; 369/288; 346/76 L, 135.1; 430/945

[56] References Cited

U.S. PATENT DOCUMENTS

| 4,433,340 | 2/1984 | Mashita et al. | 346/135.1 |
| 4,451,914 | 5/1984 | LaBudde et al. | 369/288 |
| 4,451,915 | 5/1984 | LaBudde et al. | 369/288 |
| 4,478,768 | 10/1984 | Takeoka et al. | 264/106 |

FOREIGN PATENT DOCUMENTS

| 3336445 | 4/1984 | Fed. Rep. of Germany . |
| 194152 | 11/1983 | Japan . |
| 0137697 | 4/1985 | Japan . |
| 8692457 | 5/1986 | Japan . |
| 3222109 | 9/1988 | Japan . |

OTHER PUBLICATIONS

Subbing Layer Surface Energy Effects, Davis et al., Proceeding, SPIE, 1983.

Primary Examiner—Patrick J. Ryan
Attorney, Agent, or Firm—Foley, Lardner, Schwartz, Jeffery, Schwaab, Mack, Blumenthal & Evans

[57] ABSTRACT

An optical memory for optically storing and reproducing data comprises a substrate, an under layer and a recording layer. The under layer contains carbon and fluorine. The recording layer contains carbon and at least one of a metal and semiconductor material. The under layer acts as a barrier to $H_2O$ and $O_2$ diffused through the substrate toward the recording layer. The optical memory has an excellent write sensitivity and anti-oxidization characteristics. Also, the optical memory is capable of stable data storage over a long time period.

12 Claims, 4 Drawing Sheets

OPTICAL MEMORY

BACKGROUND OF THE INVENTION

The present invention relates to an optical memory in which data may be stored and reproduced by exposure to light.

Optical memories, such as optical discs, having a layer or film of semiconductor material, are widely used in industrial and consumer recording systems such as video recorders, digital audio recorders and document digital recorders. A signal is recorded on the optical memory by irradiation with a laser beam thereby forming bits of data in a layer of semiconductor material. The optical memory permits direct reading after the data has been written and random access to the recorded data.

Generally, it is known that a layer of semiconductor material, such as Te, has sufficient write sensitivity, even when recorded with a low-output laser beam. This element, however, is easily oxidized at a high humidity. For this reason, a protective film such as $SiO_2$ is deposited on the surface, which in turn, causes degradation in write sensitivity.

An an example of an optical memory having improved write sensitivity is reported by C. R. Davis et al, "Proceedings SPIE, 420, 260 (1983)". This optical memory comprises an under layer, such as a plasma polymerized film having fluorine (F) and carbon (C), and a recording layer deposited on the under layer. The recording layer includes Te. This recording layer, however, cracks when subjected to an accelerated aging test. Therefore, in practice, this layer has not been used as the recording layer of an optical memory.

Moreover, M. Mashita and N. Yasuda disclose a recording layer containing a Te film having carbon (C) and hydrogen (H) (to be referred to as a Te-C film hereinafter ) in "Proceedings SPIE, 329, 190, (1982)". This Te—C film has a structure in which Te clusters are dispersed in a C—H matrix. This Te—C film is excellent in oxidation resistance, and preserves the high write sensitivity of a Te film without using a protective film. This film, however, is oxidized by $H_2O$ and $O_2$ diffused through the organic resin substrate such as the polycarbonate (PC), commonly used in optical memory systems, when exposed to high humidity over a long time period.

SUMMARY OF THE INVENTION

Accordingly, it is an object of the present invention to provide an improved optical memory which is resistant to diffusion of $H_2O$ and $O_2$ into the recording layer.

It is a further object of the present invention to provide an optical memory which has excellent write sensitivity and anti-oxidization characterics.

It is still a further object of the present invention to provide an optical memory which is capable of stable data storage over a long time period even under humid conditions.

In accordance with the present invention, the foregoing objects, and others, are achieved by providing an optical memory having a substrate, an under layer supported by the substrate and a recording layer supported by the under layer. The under layer contains carbon and fluorine. The recording layer contains carbon and at least one of a metal and a semiconductor element.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings, wherein.

DETAILED DESCRIPTION OF THE PREFERRED EMBODIMENTS

Figure 1:
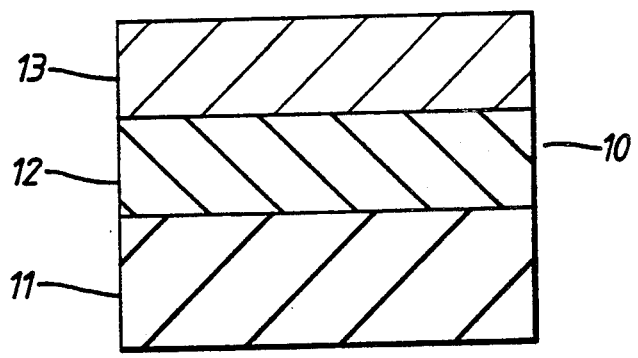
FIGS. 1 and 2 each is a sectional view of different optical memories according to the present invention.

With reference to FIG. 1, an optical memory is generally designated by 10. Optical memory 10 may be used as a computer memory medium, an image recording medium for an image information filing system, and the like. Optical memory 10 included a transparent substrate 11, an under-layer 12 and a recording layer 13.

Substrate 11 can be formed from an organic resin, such as polycarbonate or polymethyl methacrylate. Under-layer 12 is formed on substrate 11 and has a plasma polymerized film having carbon (C) and fluorine (F). Under-layer 12 preferably has a thickness within a range of about 20 to 1,000 Angstroms in order to obtain a high recording sensitivity and a stable condition for a long time period.

Recording layer 13 is formed on under-layer 12. Recording layer 13 contains;

(i) at least one of a metal and semiconductor element including at least one element selected from the group consisting of Te, Se, Ge, Sb, Pb, Sn, Ag, In and Bi; and (ii) carbon and hydrogen.

Data can be recorded in recording layer 13 by forming pits ( not shown ) therein by means of a laser beam. Namely, data is recorded in recording layer 13 by heat mode recording using the laser beam.

Recording layer 13, which includes at least one of a metal and a semiconductor element, as mentioned above, with carbon and hydrogen, has good write sensitivity and anti-oxidization characteristics.

According to optical memory 10 of the present invention, recording layer 13 has a thickness which provides a local maximum value of reflectivity of the reproducing light, due to a multiple interference effect by recording layer 13. In the present invention, recording layer 13 preferably has a thickness within a range of 2,000 angstroms or less, more preferably within a range of 100 to 800 angstroms.

In optical memory 10, under-layer 12 serves as a barrier to $H_2O$ and $O_2$ diffused from substrate 11 with respect to recording layer 13. Therefore, recording layer 13 is not oxidized in an atmosphere at a high humidity over a long time period. Optical memory 10 has excellent anti-oxidization characteristics. Also, underlayer 12 and recording layer 13 each has carbon (C). Therefore, there is sufficient adhesive power between under-layer 12 and recording layer 13. No cracks appear on recording layer 13 of optical memory 10, if it is left in an atmosphere of high humidity over a long time period.

Figure 2:
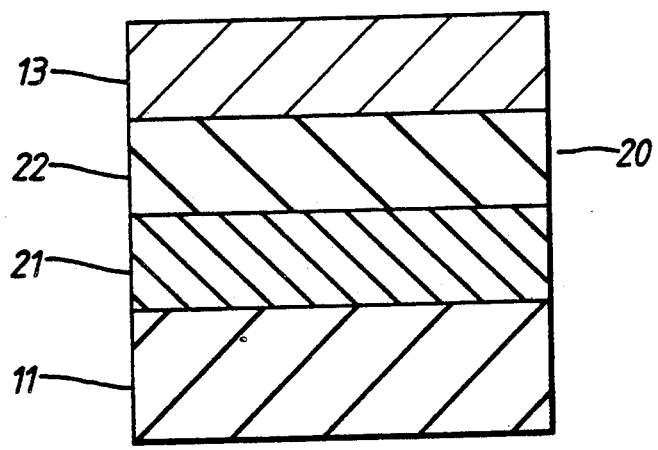

In another embodiment of the present invention, shown in FIG. 2, an optical memory 20 includes a substrate 11, a second under-layer 21, a first under-layer 22 and a recording layer 13. Second under-layer 21 is formed on substrate 11 and first under-layer 22 is formed between second under layer 21 and recording layer 13. Second under-layer 21 includes a plasma polymerized film having carbon (C) and hydrogen (H). First under-layer 22 includes a plasma polymerized film having carbon (C) and fluorine (F). First and second under-layers 22 and 21, respectively each preferably having a thickness within a range of 20 to 500 angstroms in order to obtain a high recording sensitivity and a stable condition for a long time period. The adhering strength between substrate 11 and second under-layer 22 may be increased by using a C—F plasma polymerized film.

Methods such as sputtering and the like, may be used to prepare optical memories 10 and 20. For example, optical memory 10 may be prepared using the sputtering apparatus shown in FIG. 3.

The sputtering apparatus contains a chamber 40, gas lines 42, 44 and 46, an oil revolution pump 48, a cryo pump 50 and a selection valve 52. Gas lines 42, 44 and 46 are formed on the bottom wall of chamber 40 and are operated so as to charge $C_3F_8$ gas, $CH_4$ gas and Ar gas into chamber 40, respectively. Pumps 48 and 50, which adjust the vacuum pressure into chamber 40, are coupled to chamber 40 through valve 52. Chamber 40 contains substrate 11 supported by a support member 54, which is rotated by a motor (not shown). Chamber 40 also contains a shutter 56, a Te target 58 and a coil 59. The Te target 58 is disposed below the shutter 56 and is coupled to a power supply 60. Also, coil 59, which performs a glow discharge, is coupled to a power supply 62.

In the present invention, a preferred sputtering method is a magnetron sputter method, wherein a magnet is placed under target 58. According to this apparatus, the electrons in the plasma are concentrated near target 58 and almost none reach the substrate 11. This is particularly useful when using an organic resin substrate, which has bad thermal resistance characeristics.

EXAMPLE 1

Figure 3:
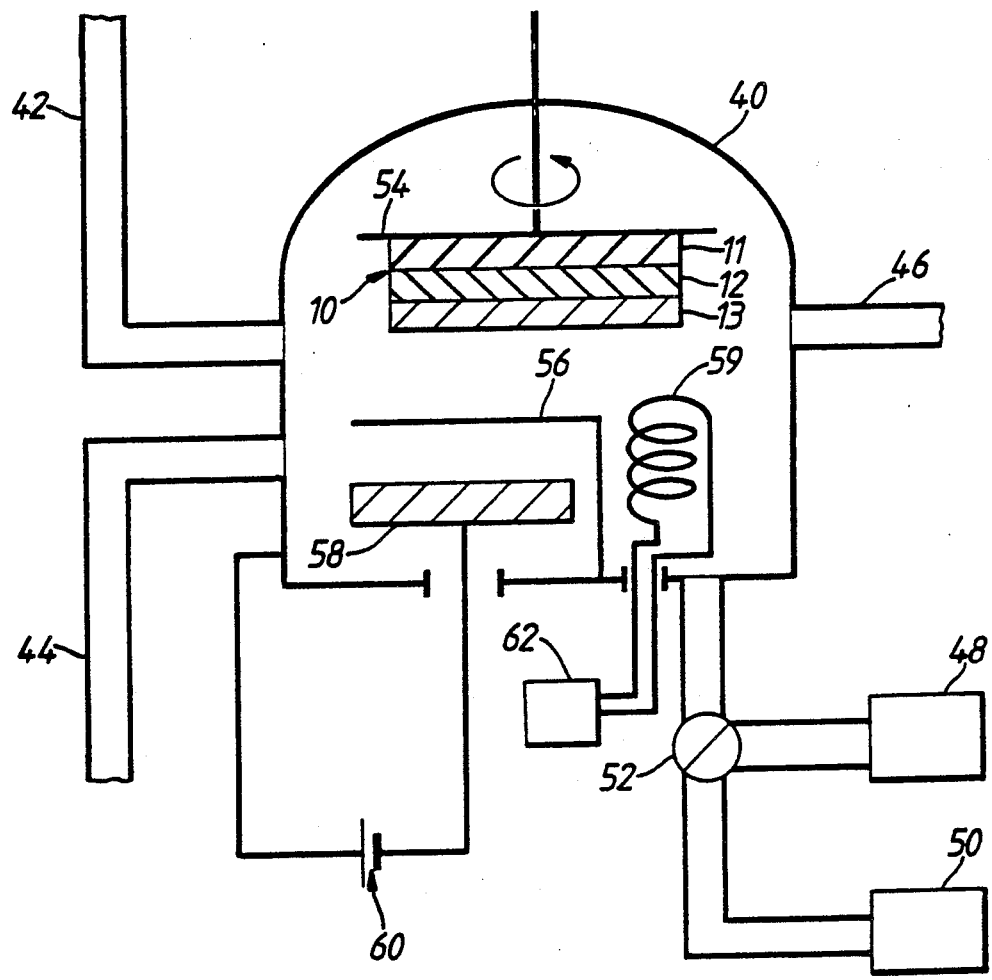
FIG. 3 is a schematic diagram depicting a sputtering apparatus for use in preparing the optical memory of the present invention.

In accordance with the procedure described below, an optical memory of the present invention was prepared using the apparatus shown in FIG. 3.

Substrate 11 comprising polycarbonate resin was provided in the form of a disc having a diameter of about 130 mm and a thickness of about 1.2 mm. Substrate 11 was cleaned and fixed to support member 54. Substrate 11 was then rotated at about 60 rpm. First, air was exhausted by valve 52 until 0.5 mTorr pressure was present on the side of oil revolution pump 48. Air was exhausted to obtain a vacuum pressure of about $5 \times 10^{-6}$ Torr or less in chamber 40. Next, $C_3F_8$ gas was introduced into chamber 40 a fluorocarbon gas line 42 and the flow rate thereof was adjusted so as to obtain a pressure allowing a glow discharge. The flow rate of $C_3F_8$ gas was set at 8 SCCM. When the pressure of chamber 40 was 0.1 Torr, valve 52 was switched from the side of cryo pump 50 to the side of oil revolution pump 48. RF coil 59 was supplied with power of 150 w from power supply 61, so as to perform a glow discharge. In this atmosphere, $C_3F_8$ gas was reduced and the plasma polymerized reaction progressed. Thus, under-layer 12, comprising a plasma polymerized film having carbon (C) and fluorine (F), was formed on substrate 11, and the thickness of under-layer 12 was adjusted to about 1,000 angstroms.

Next, after air was exhausted with valve 52 on the side of cryo pump 50 to obtain a vacuum pressure of about $5 \times 10^{-6}$ Torr or less in chamber 40, $CH_4$ gas and Ar gas were introduced into chamber 40 from gas lines 44 and 46, respectively, at a flow rate of 10 SCCM. Also, valve 52 was adjusted so as to obtain a vacuum pressure of $5 \times 10^{-3}$ Torr inside chamber 40 and shutter 56 was closed. In this atmosphere, Te target 58 was sputtered by supplying a power of 80 W from DC power supply 60. Shutter 56 was opened after one minute. Thus, recording layer 13 was formed on under-layer 12, and the thickness of recording layer 13 was adjusted to about 250 angstroms. It was confirmed that the resulting recording layer 13 contained carbon (C), hydrogen (H) and Te.

Figure 4:
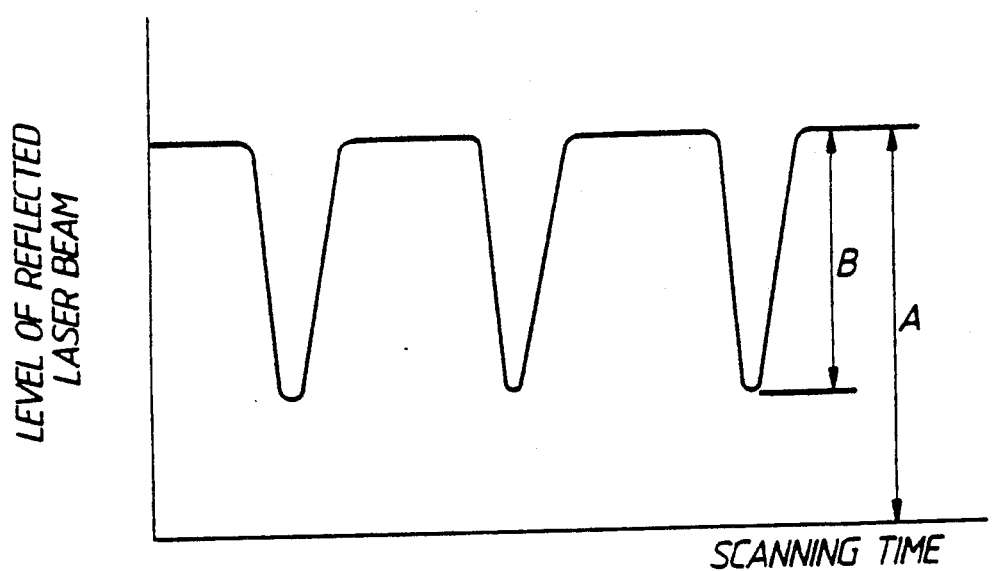
FIG. 4 is a graph showing a signal reproduced from an optical memory of the present invention having maximum and nonmaximum values.

As shown in FIG. 4, the optical memory exhibits a reproduction signal obtained when reading data written in the recording film with a pulse width of 60 nsec using a GaAs semiconductor laser of 8 mW.

The contrast ratio of the signal may be given by the B/A ratio in the drawings. The contrast ratio is regarded to be high as the B/A ratio is increased. It was apparent that the contrast ratio of the recording layer of the present invention is the highest at a local maximum value of reflectivity, due to multiple interference effects.

Figure 5:
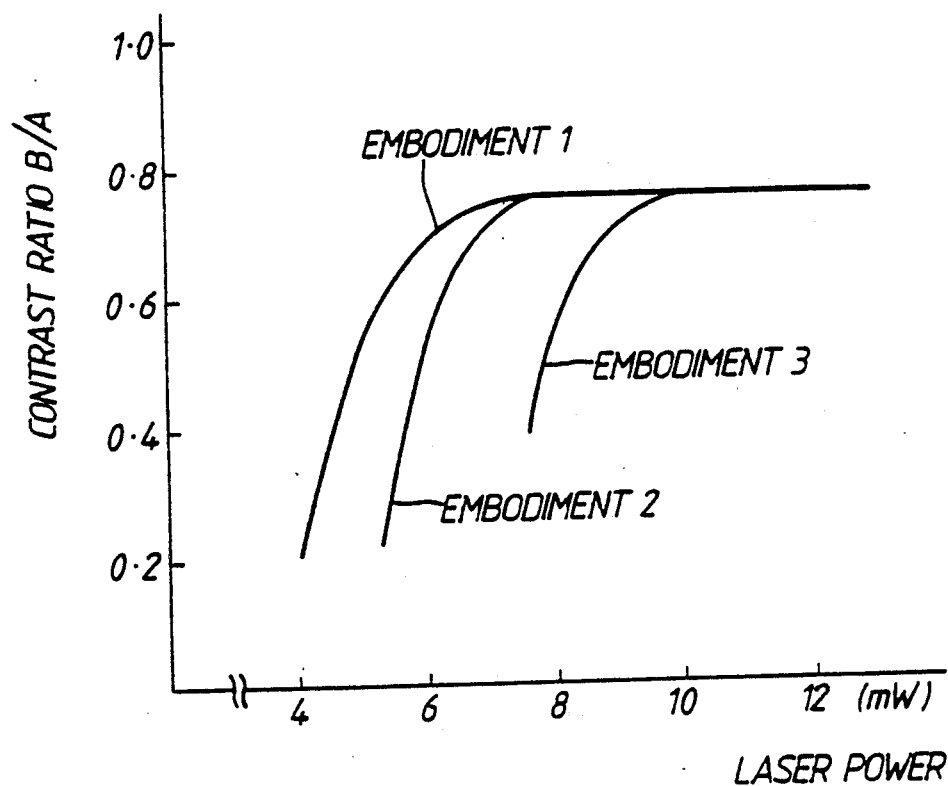
FIG. 5 is a graph showing the relationship between the contrast ratio and the write power of a laser beam.

Next, the relationship between laser power during writing and the B/A ratios of readout signals was checked with respect to embodiments 1, 2 and 3. The results were illustrated in FIG. 5. Embodiment 1 was an optical memory of the present invention. Embodiment 2 was an optical memory having a Te—C film deposited on the substrate. Embodiment 3 was an optical memory having a Te film deposited on the substrate. Also, the writing was performed by a semiconducter laser beam of 830 nm wavelength with a pulse width of 60 nsec while the optical memories were rotated at a linear velocity of 5 m/sec. It was apparent that embodiment 1 had an excellent write sensitivity in comparison with embodiments 2 and 3.

EXAMPLE 2

An optical memory was prepared as described in Example 1, except that target 58 is a sputtering target containing Se, Ge, Sb, Pb, Sn, Ag, In or Bi. As a result, a recording layer comprising Se, Ge, Sb, Pb, Sn, Ag, In or Bi, and carbon (C) and hydrogen (H) was formed on the under-layer having carbon (C) and fluorine (F).

The contrast ratios of these recording layers were substantially the same as that of the recording layer comprising Te, carbon (C) and hydrogen (H). Therefore, an optical memory comprising an under-layer having carbon (C) and fluorine (F) and a recording layer formed on the under-layer, including an element selected from the group consisting of Se, Ge, Sb, Pb, Sn, Ag, In and Bi, also provided a high write sensitivity.

EXAMPLE 3

An optical memory of the present invention (embodiment 1) was prepared as described in Example 1. Also, optical memories (embodiments 2 and 3) were prepared as described in Example 1.

Figure 6:
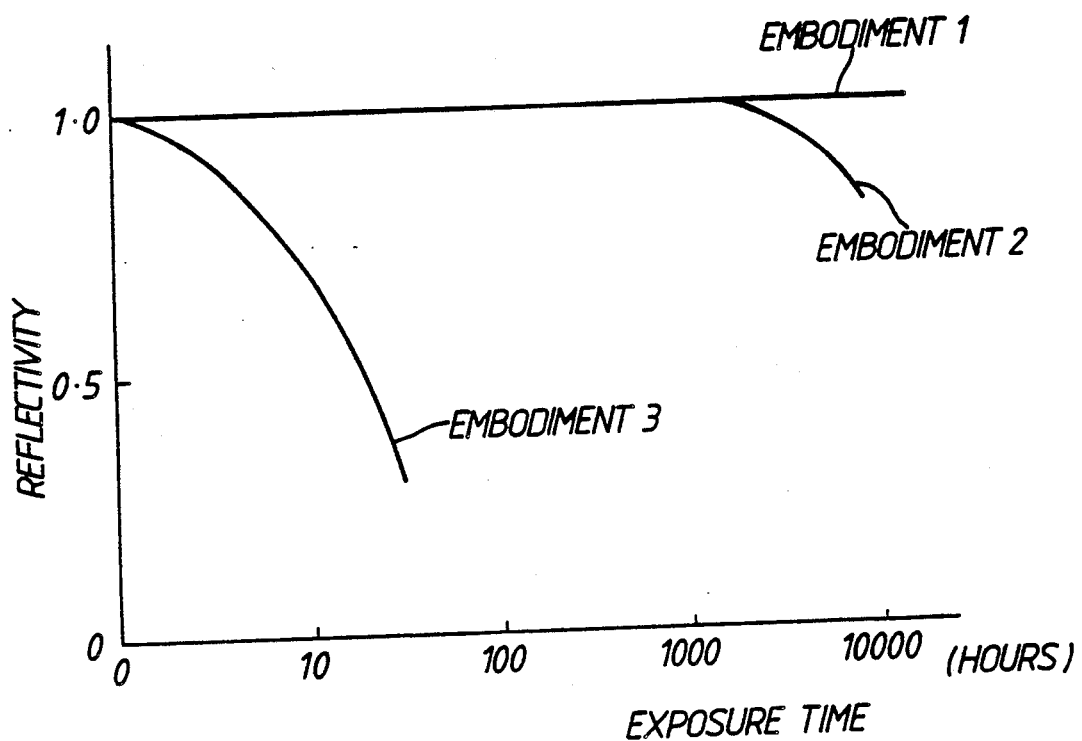
FIG. 6 is a graph showing the relationship between the reflectivity and exposure time.

To test durability, the recording layers of the optical memories thus obtained were exposed to high temperature and humidity conditions. The reflectivities of the recording layers under the accelerated aging test in an atmosphere of about 65° C. and about 90% RH are shown in FIG. 6. The reflectivity of the recording layer of embodiment 3 was remarkably lower after more than 10 hours. Also, the reflectivity of the recording layer of embodiment 2 was remarkably lower after about 1,000 hours. However, in the recording layer of embodiment 1, no change was observed in more than 1,000 hours of testing. Namely, the recording layer of the present invention was stable for a long time period.

Also, after an accelerated aging test of 1,000 hours, the surface conditions of the recording layers were observed using an optical microscope and a scanning electron microscope (SEM). The recording layers of embodiments 2 and 3 had oxidized completely and had become transparent. However, in the recording layer of embodiment 1, no cracks were observed and the initial condition of the surface was maintained. Namely, it was apparent that the recording layer of the present invention had high write sensitivity and auti-oxidization characteristics.

It should be understood that the detailed description and examples, which indicating presently perferred embodiments of this invention, are given by way of illustration only. Various modifications and changes may be made to the present invention, without departing from the scope or spirit of the invention, as set forth in the following claims.

What is claimed is:

1. An optical memory comprising:
   a substrate containing an organic resin;
   an under-layer containing carbon and fluorine supported on the substrate and having a thickness of about 20 to 1,000 Angstroms; and
   a recording layer containing carbon and at least one of a metal and a semiconductor element supported on the under-layer, the recording layer having a thickness of about 2,000 Angstroms or less.

2. An optical memory as claimed in claim 1, wherein the at least one of a metal and a semiconductor element includes an element selected from the group consisting of Te, Se, Ge, Sb, Pb, Sn, Ag, In and Bi.

3. An optical memory as claimed in claim 1, wherein the recording layer contains hydrogen.

4. An optical memory as claimed in claim 1, wherein the recording layer has a thickness within a range of about 100 to 800 Angstroms.

5. An optical memory as claimed in claim 1, further comprising a second under-layer containing carbon and hydrogen between the substrate and the under-layer.

6. An optical memory of claim 1, wherein the recording layer contains Te.

7. An optical memory comprising:
   an organic resin substrate subject to diffusion therethrough of $H_2O$ and $O_2$ from a surrounding atmosphere;
   under-layer means, containing carbon and fluorine and disposed on the organic resin substrate for resisting diffusion of $H_2O$ and $O_2$ through the organic resin substrate, the under-layer means containing a first layer having a thickness of about 20 to 1,000 Angstroms; and
   recording layer means containing carbon and disposed on the under-layer means, including at least one of a metal and a semiconductive material for maintaining a high recording sensitivity of the optical memory, the recording layer means comprising a second layer having a thickness of about 2,000 Angstroms or less, the second layer providing a local maximum value of reflectively of reproducing light due to a multiple interference effect by the recording layer means.

8. An optical memory as claimed in claim 7, wherein the at least one of a metal and a semiconductive material includes an element selected from the group consisting of Te, Se, Ge, Sb, Pb, Sn, Ag, In and Bi.

9. An optical memory as claimed in claim 7, wherein the carbon-containing recording layer contains hydrogen.

10. An optical memory as claimed in claim 7, further comprising carbon and hydrogen-containing under-layer means between the substrate and the carbon and fluorine-containing under-layer means for increasing an adhering strength between the substrate and the carbon and fluorine-containing under-layer means.

11. An optical memory comprising:
    a substrate containing an organic resin;
    an under-layer containing carbon and fluorine supported on the substrate and having a thickness of about 20 to 1,000 Angstroms; and
    a recording layer containing carbon and tellurium supported on the under-layer, the recording layer having a thickness of about 2,000 Angstroms or less.

12. An optical memory comprising:
    an organic resin substrate subject to diffusion therethrough of $H_2O$ and $O_2$ from a surrounding atmosphere;
    under-layer means, containing carbon and fluorine, and disposed on the substrate for resisting diffusion of $H_2O$ and $O_2$ through the substrate, the under-layer means containing a layer having a thickness of about 20 to 1,000 Angstroms in order to obtain a high recording sensitivity and a stable condition for a long time; and
    recording layer means, containing tellurium and carbon and disposed on the under-layer means, for maintaining a high recording sensitivity of the optical memory, the recording layer means containing a layer having a thickness of about 2,000 Angstroms or less in order to provide a local maximum value of reflectivity of reproducing light due to a multiple interference effect by the recording layer means.

* * * * *